United States Patent [19]

Mangiavacchi

[11] 3,824,808
[45] July 23, 1974

[54] COUNTERBALANCING DEVICE FOR COUPLING SHAFTS FOR UNIVERSAL JOINTS

[75] Inventor: Jacques Mangiavacchi, Chatou, France

[73] Assignee: Societe Anonyme: Glaenzer Spicer, Poissy, France

[22] Filed: Feb. 28, 1973

[21] Appl. No.: 336,878

[30] Foreign Application Priority Data
May 5, 1972 France .............................. 72.16144

[52] U.S. Cl....................... 64/17 A, 64/1 V, 74/574
[51] Int. Cl............................................... F16d 3/26
[58] Field of Search ...... 64/17 R, 17 SP, 17 A, 1 V; 74/573, 574

[56] References Cited
UNITED STATES PATENTS

| 2,114,861 | 4/1938 | Slaght ................................. 64/17 A |
| 2,209,855 | 7/1940 | Slaght ................................. 64/17 A |
| 2,377,096 | 5/1945 | Nichols ................................ 74/573 |
| 2,380,646 | 7/1945 | Harrington .......................... 64/17 A |
| 3,552,811 | 1/1971 | Kayser ................................ 64/17 A |
| 3,611,830 | 10/1971 | Shank ................................. 74/574 |

Primary Examiner—Samuel Scott
Assistant Examiner—Randall Heald
Attorney, Agent, or Firm—Baldwin, Wight & Brown

[57] ABSTRACT

A counterbalancing device for correcting disequilibrium in shafts connected by universal joints having a yoke fixed to the driving shaft and a yoke fixed to the driven shaft, the yokes are connected by cross piece with journals at the ends of its arms rotatably mounted in bearings in the yokes. A stirruplike strap is secured by means of bolts which secure the associated plate. The strap receives interchangeable calibrated counterweights which are removably held therein by a resilient locking arrangement including an inwardly projecting portion received in a corresponding hole in the counterweight. The strap also acts as a lockwasher member for the bolts. By replacing the counterweights the shafts of the power transmission coupling may be balanced.

5 Claims, 1 Drawing Figure

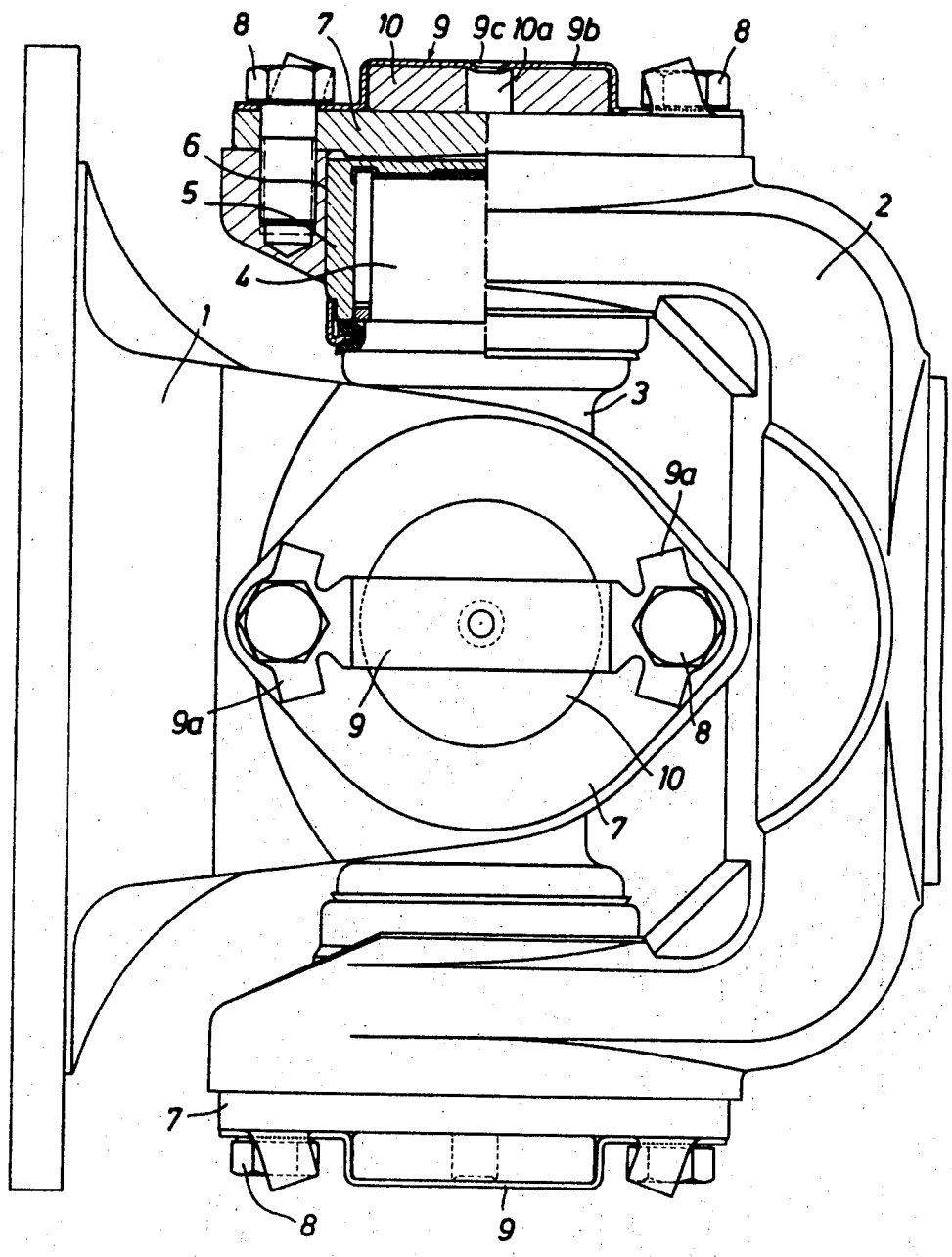

3,824,808

COUNTERBALANCING DEVICE FOR COUPLING SHAFTS FOR UNIVERSAL JOINTS

The present invention concerns power transmission couplings with universal joints.

It is known that such power transmission couplings usually comprise two universal joints each having two yokes fixed respectively to a driving and a driven shaft, the yokes being connected by a cross piece having journals pivotally mounted in coaxial bearing in the yokes.

These power transmission couplings are very often used for high rotational speeds, particularly in the case of motor vehicles. It is therefore desirable for the majority of applications of such power transmission couplings for one of the main power shafts to coincide with the axis of rotation. In fact if this is not the case a phenomenon called disequilibrium which may be manifest itself is mechanical vibrations which are deleterious to the proper functioning of the coupling and the member which it couples as well as by affecting the feeling of comfort experienced by the passengers of the vehicles in which such couplings are provided.

But it has been determined that the component parts of such universal joints cannot be machined and assembled perfectly balanced, and therefore it has been necessary to correct the disiquilibrium with special means which enable the axis of one of the principal power shafts to be brought into alignment with the axis of rotation of the coupling.

To this end there is a practive whereby counterweights are added on or removed from each joint determined according to both weight and position in order to effect a counter-balancing of the joint which is as perfect as possible.

The most common arrangement employed for adding such masses consists either in welding small plates of different weights or in substituting component parts of identical shape of different weight for one or more of the component parts of the coupling, series of such parts are therefore provided the weight of which vary between certain predetermined limits.

An object of the present invention is a counter balancing device for a drive shaft associated with an universal joint employing the first of these aforementioned solutions, i.e., adding small plates or similar members of different weights, but which in application is simpler and more economical than that which heretofore has been proposed.

The device according to the invention essentially comprises a stirruplike strap attached to each of the outer faces of the yokes centered along the axes of the bearings therein, interchangeable calibrated counterweights being arranged to be received between the straps and the yokes, and means for resilient latching the counterweights under straps.

A series of calibrated counterweights of different weights are provided as is usually the case. In order to change the conterweights it is simply necessary to revove the disc held under the strap against the spring action of the resilient retaining means and replace it with another.

The counterweights may be circular or polygonal dises conforming to the inside of the stirruplike strap and formed preferably of metal or metal alloy such as lead or steel.

The stirruplike strap is itself preferably formed as a metal band, for example steel, suitably bent. The resilient retaining means for the counterweights under the straps comprise at least one projecting portion formed on the undersurface of the strap and adapted to extend into a corresponding hollowed-out portion formed in the counterweight.

In a preferred embodiment for use in universal joints in which the journals of the cross piece are engaged in bearings arranged in the yokes by plate held thereagainst by means of bolts, the stirruplike strap is itself attached to the plate by the bolts securing the bolts and constitutes a locknut for the bolts.

The accompanying figure illustrated in side elevation partially in section a universal joint provided with a counterbalancing device according to an embodiment of the invention.

In the illustrated embodiment the universal joint comprises in a known manner a flanged yoke 1 and a yoke 2 welded to its associated shaft and a cross piece 3 whose journals 4 are received in needle bearings 5 held in corresponding bores 6 in the yokes by plates 7 secured to the yokes by means of pairs of bolts 8. The bolts 8 are locked in place by lugs 9a of a lockwasher member 9 extending between the bolts associated with each plate. The central portion 9b of the member forms a stirruplike strap under which a counter-weight 10 is received. The lugs 9a of the lockwasher member 9 are illustrated in the middle of the drawing in their flat position before the nuts are locket whereas at the top and bottom of the drawing the lockwasher member 9 is in its locked position.

The counterweights 10 are formed as flat circular dics with a central hole 10a which cooperates with an eye-piece-shaped portion 9c formed in the portion 9b of the stirruplike strap in order to provide a projecting portion on the lower surface of the strap which assures the resilient retaining of the counterweight 10 under the strap. It has been discovered that in this manner a counterweight 10 may be introduced into the stirruplike strap and removed therefrom by simply exerting a lateral force thereon, once the universal joint is assembled. The resilient locking between the piece-shaped portion 9c and the central hole 10a in the counterweight 10 assures the holding in place of the counterweight. An arrangement of a sufficient mumber of counterweights 10 having different weights within a sufficiently wide range is provided whereby by use of a counterweight of desired value any condition of disequilibrium which might exist may be corrected. The juxtapositioning of the counterweights and any subsequent possible replacement by other counterweights in the course of adjusting the equilibrium can be carried out very easily without necessitating the disassembly and reassembly of other parts such as the plates 7, as is the case with a known method wherein these plates are replaced after measuring the amount of disequilibrium with plates of different weights.

I claim:

1. A counterbalancing device for power transmission couplings including at least one universal joint having two yokes each fixed to one of a driving and driven shaft and joined together by a cross piece, the journals of the cross piece being mounted for rotation in coaxial bearings in the yokes, comprising, in combination, a stirruplike strap attached to the outer faces of each of the yokes and centered about the axes of the bearings on the yokes, calibrated interchangeable counterweights arranged to be received under said straps and resilient locking means for holding the counterweights under the stirruplike straps.

2. A device according to claim 1, wherein the counterweights comprise metal geometrically shaped discs.

3. A decide according to claim 1, wherein the stirruplike strap is formed as a suitably bent metal band.

4. A device according to claim 3, wherein said resilient locking means comprise at least one projecting portion formed on the undersurface of each strap and adapted to penetrate into a corresponding hole formed in each counterweight.

5. A device according to claim 1, wherein said resilient locking means comprise at least one projecting portion formed on the undersurface of each strap and adapted to penetrate into a corresponding hole formed in each counterweight.

* * * * *